United States Patent [19]

Baumann

[11] Patent Number: 4,613,798
[45] Date of Patent: Sep. 23, 1986

[54] ELECTRIC-POWERED SPRING-RETURN ACTUATING DEVICE

[76] Inventor: Peter H. Baumann, 32 Pine St., Rye, N.H. 03870

[21] Appl. No.: 718,799

[22] Filed: Apr. 1, 1985

[51] Int. Cl.⁴ ............................................. F16K 31/44
[52] U.S. Cl. ......................................... 318/160; 318/9; 318/40; 318/54; 251/25; 251/129.11
[58] Field of Search ............... 318/8, 9, 38, 40, 54, 318/160, 439, 159, 436; 192/142 R; 251/133, 134, 129.02, 129.11, 129.12, 129.13, 25

[56] References Cited

U.S. PATENT DOCUMENTS

| | | | |
|---|---|---|---|
| 3,743,182 | 7/1973 | Harmon et al. | 318/160 X |
| 3,955,792 | 5/1976 | Cho | 251/129.11 X |
| 4,097,786 | 6/1978 | Lund | 251/129.11 X |
| 4,099,704 | 7/1978 | Okumura et al. | 251/129.12 |

Primary Examiner—William M. Shoop, Jr.
Assistant Examiner—Bentsu Ro

[57] ABSTRACT

Electric-powered actuating device usable for the positioning control of valves and the like, featuring a motor, mechanical and spring means capable of driving said valve or other attached devices into a predetermined safety position in case of electrical signal or power failure; said actuating device having electrical amplifying means capable of providing pulsed current to drive said motor in one direction, a direct current to hold the motor in a selected position or, no power, to allow the mechanical and spring means to reverse the motor direction.

4 Claims, 2 Drawing Figures

ELECTRIC-POWERED SPRING-RETURN ACTUATING DEVICE

BACKGROUND OF THE INVENTION

This invention constitutes a major improvement in electric actuators heretofore used for the driving of valves and other devices following the command signal of an automatic controller or computing device. A typical example for prior state of the art device is found in U.S. Pat. No. 3,150,752 by Baumann. Here a stepping motor converts electrical impulses into small turns of a lead screw which in turn drives a reciprocating valve stem up or down. With either power or signal failure, the actuator will remain in the last position of the lead screw, a condition that does not satisfy requirements of most automatic control valve applications.

A fuel control valve to a boiler should fail-close, in order to avoid a possible overheating, if electrical failure occurs. Certain coolant control valves, on the other hand, should fail-open.

There is, therefore, a great need for so-called fail-safe electric valve actuators to replace the currently used pneumatically actuated and fail-safe spring-diaphragm actuators. Presently used electric actuators employ gear drives or threaded spindles to convert the relatively high-speed electric motor revolutions into higher forces but slower output motion. It is inherent in these high mechanically amplified devices that their efficiency is less than 30%, negating any possibility of reversing the motion by spring means to achieve the desired "fail-safe" action. Other attempts have been made to drive the motor into a safe position upon an electric line failure by means of a relay switched battery. However, such solution is not only awkward and space consuming but offers only limited reliability unless the battery is maintained periodically.

Operators using gear trains as mechanical amplification of forces suffer from wear and, more importantly, back-lash which impedes the desired accuracy of the actuator.

This invention overcomes these and other disadvantages of the current state of the art devices. Instead of gear speed reduction, this invention uses a double-pitched cable drive, which not only offers no back-lash caused by play between meshing gear teeth, but achieves great mechanical amplification with up to 80% efficiency. Such high efficiency in turn allows the use of mechanical springs to reverse the rotation of the electric motor drive in order to achieve a desired safety position following a power failure.

Connecting this spring-loaded actuating stem directly onto a valve shaft, eliminates problems of conventional mechanical override mechanisms to absorb thermal expansion of a valve shaft, featured, for example, in U.S. Pat. No. 3,150,752. The absence of gears and mechanical override devices leads to a dramatic simplification, great cost savings and a substantial increase in reliability over present similar devices.

The amplifying circuit is further designed to drive the motor only in a direction opposite to the direction of the spring force. Upon reaching the desired valve position, the motor drive current is replaced by a locking DC current. For reverse action, the DC current is switched off, allowing the spring force to drive the motor backwards. This "One-Way" switching action greatly simplifies the electronic control circuit, leading to important cost savings and increase in reliability.

These and other important advantages and improvements will be more clearly shown in the following description of the invention and in conjunction with the accompanying drawings, in which.

DESCRIPTION OF MY INVENTION

Figure 1:
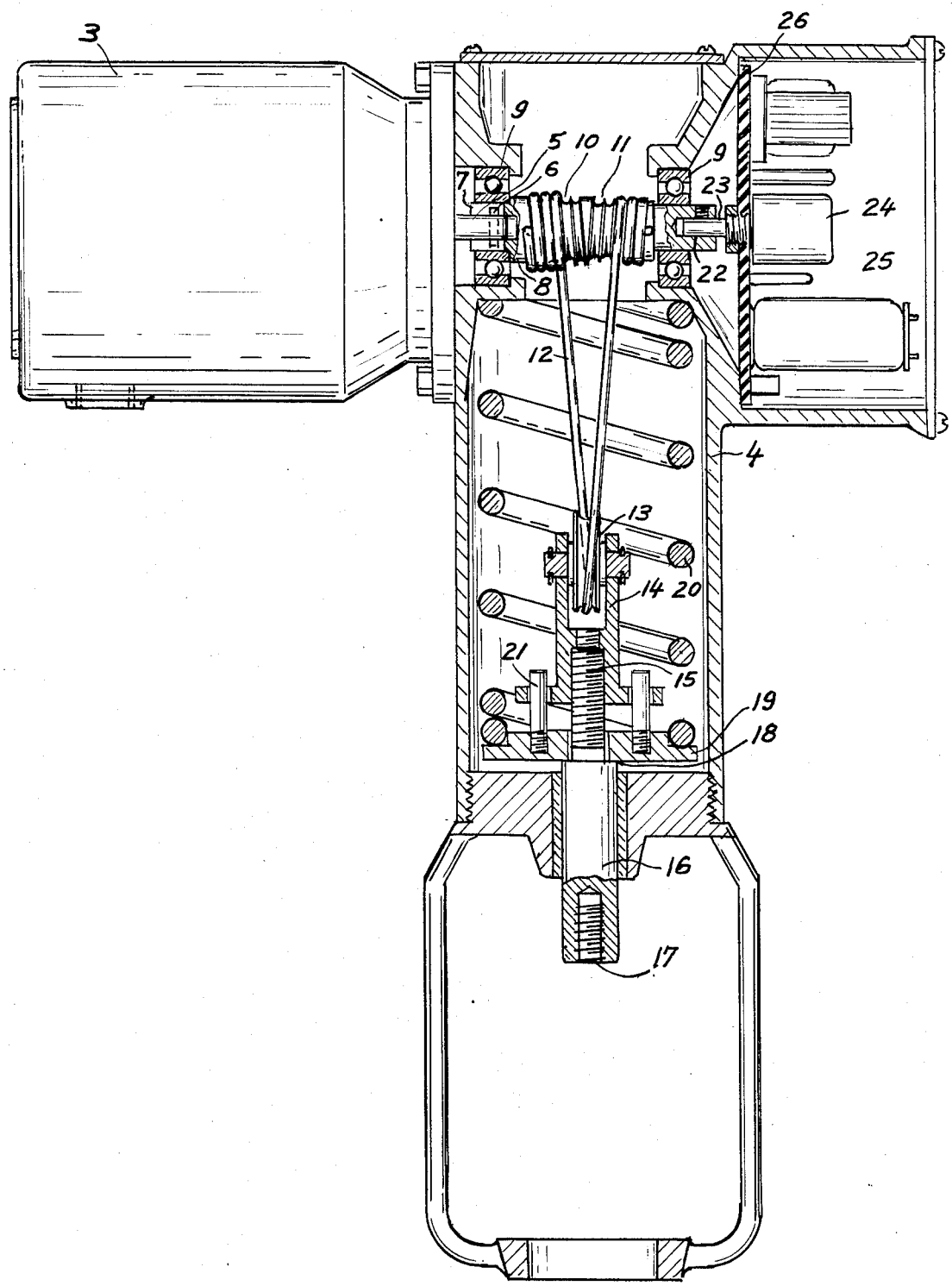
FIG. 1 is a vertical, partially sectional view of a preferred embodiment of the invention.

Referring to FIG. 1, an electric motor 3, preferably a so-called stepping motor and capable of operating continuously with 110 V AC at 72 rpm is connected to an actuator frame 4. The output shaft 5 of said motor has a drive pin 6 slidingly engaging a slotted opening 7 of a spindle 8 which is supported on each end by ball bearings 9. Spindle 8 is divided into two threaded sections; the first one 10 has, in a preferred configuration, a pitch diameter of 1.00 inch, while the second one 11 has a pitch diameter of 0.900 inch. A steel cable 12 is wound around the larger pitch diameter 10, then through a pulley 13 and finally around the smaller pitch diameter portion 11, before each end is suitably anchored within spindle 8.

Threaded portions 10 and 11 have opposite pitch angles to enable the cable to move towards the centrally located pulley 13 without undue strain.

Pulley 13 is suitably fastened to a yoke 14, the lower portion of which engages the threaded top portion 15 of an actuator stem 16, whose lower end 17 is configured to engage valve stems and the like. Actuator stem 16 has a shoulder portion 18 which supports a spring button 19 compressively engaging a coiled compression spring 20.

Guide pins 21 prevent yoke 14 from rotating while stem thread 15 is engaged to provide tightening of cable 12 and pre-compression of spring 20 during the initial assembly phase.

Figure 2:
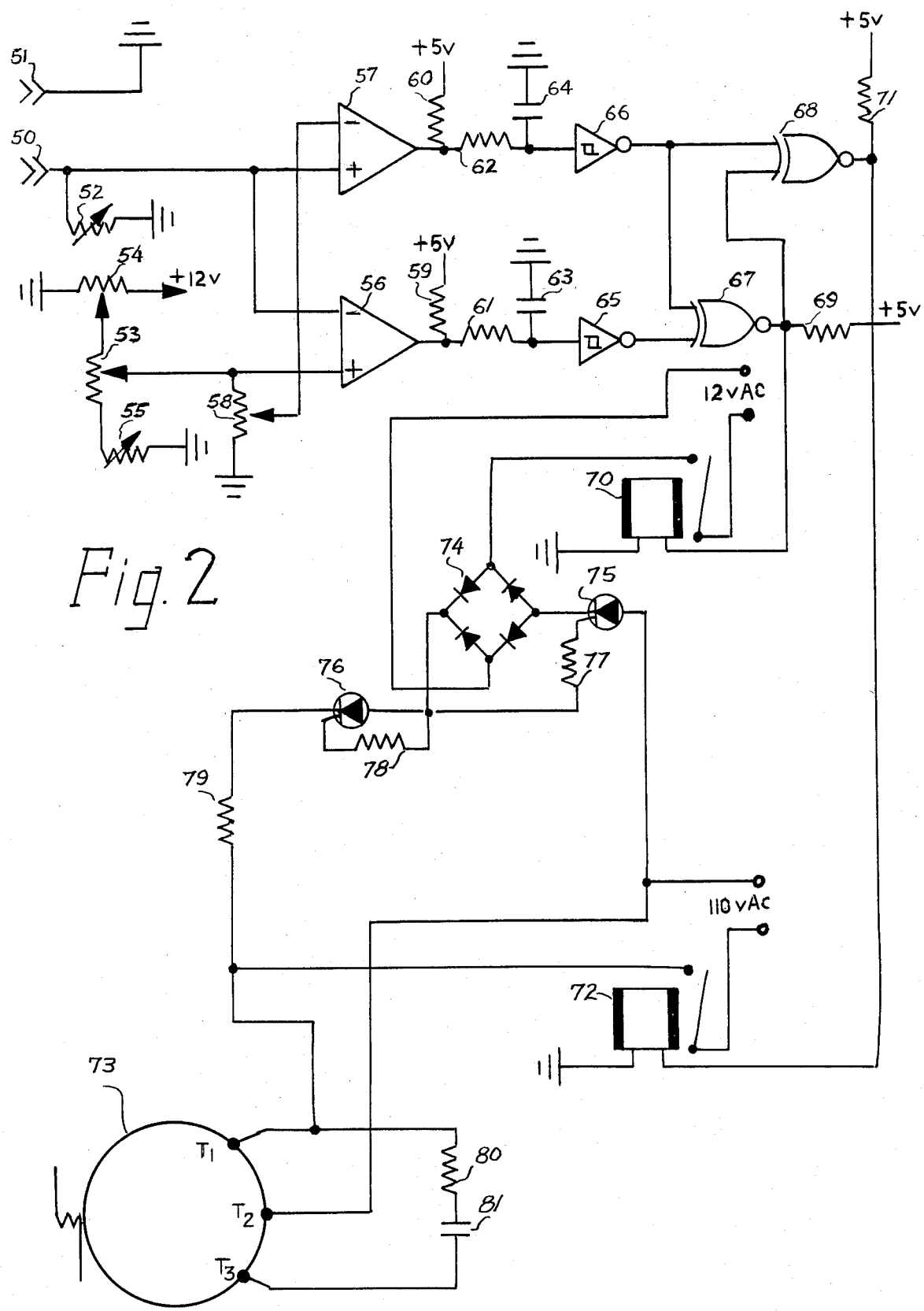
FIG. 2 is a schematic circuit diagram showing the arrangement of components of the electronic logic and amplifying system.

Any right-hand rotation of motor shaft 5, caused by a suitable current switching by the electronic circuit shown in FIG. 2, will turn spindle 8 via pin 6. This will wind further cable 12 onto the larger pitch diameter portion 10 (1.00×3.14 inches/turn) while, at the same time, unwinding from the smaller diameter portion 11 at the rate of 0.90×3.14 inches/turn. The end result is that pulley 13 advances at one half the difference between the up and down motions of cable 12, i.e. 0.5(1.00×3.14−0.90×3.14)=0.157 inches/turn of motor shaft 5. Expressed differently, the pulley motion=1.57 times the difference in pitch diameter per motor turn. The theoretical mechanical advantage thus derived in the preferred embodiment can be calculated by comparing the work done by the motor to the work produced in pulling a force attached to the pulley. In this example, a motor with 15.8 inch-lbs. torque will produce a work output of 15.8×2×3.14=99.27 inch-lbs. per turn. Since the pulley 13 motion is 0.157 inch, the theoretical force that the pulley may move against is now 99.27/0.157=632 lbs.; a mechanical advantage of 40:1, (632/15.8).

This high-force amplification is possible without need for a large number of successive gear trains with their associated backlash and wear problems. The differential cable system is accomplishing this task at efficiencies approaching 80%, a feat not possible with 40:1 gear train ratios (the resultant gear efficiency is generally below 50%, which would make the whole system unworkable).

Since the efficiency of the cable system is well above 50%, the force of spring 20 is able to back-drive the motor shaft 5 in the reverse direction should the electronic logic system of FIG. 2 call for a reverse in direction or else, should either the controller signal or the motor current fail. In the latter case, actuator stem 16 will descend, propelled by the force of spring 20, to close an attached valve (not shown).

In order for the logic system (FIG. 2) to sense the motor stem position, spindle 8 has a recess 22 engaging therein the shaft 23 of a rotary potentiometer 24 calibrated to produce a feedback voltage in proportion to the motor shaft 5 position.

A cavity 25 of the outer part of frame 4 houses one or more circuit boards 26 with attached electronic logic and switching elements, as more closely described below and shown in FIG. 2.

While the shown configuration has actuator stem 16 extend down on power failure, a suitable extention of guide pins 21 towards the top of frame 4 could provide means to pull a second stem down, in order to provide a "Fail-Open" valve position for example.

The electronic circuit shown in FIG. 2 may be described as follows:

A 4-20 mA controller signal enters the circuit from an externally generated current source, such as a process control computer of conventional art and as function of a sensed controlled variable, at terminals 50 and 51. The positive portion of the signal being applied at terminal 50 and the negative portion being applied at terminal 51. The controller signal is then converted at terminal 50 to a controller signal voltage by a factory-preset potentiometer 52 shunted to ground. Terminal 51 is directly shunted to ground.

A feedback voltage is generated by potentiometer 53. The feedback voltage span adjustment and zero adjustment are provided by potentiometer 54 in conjunction with potentiometer 55.

The controller signal voltage and the feedback voltage are then double compared. The first comparison occurs with the feedback voltage applied to the non-inverting input of a voltage level comparator 56, and the controller signal voltage applied to the inverting input of the same comparator 56. The second comparison occurs with the feedback voltage applied, through a potentiometer 58, to the inverting input of a voltage level comparator 57, and the controller signal voltage applied to the non-inverting input of the same comparator 57. The potentiometer 58 provides the circuit with an adjustable sensitivity. Two resistors 59, 60 provide the necessary pull-up resistance for generating output signals from the comparators 56, 57.

The outputs from the comparators 56, 57 are then passed through filters, consisting of a series resistor 61, 62 and a capacitor 63, 64, shunted to ground, designed to provide a time delay to prevent instability in the circuit. Each signal is then passed through a Schmitt Trigger Inverter 65, 66, which completes the filtering process by logically inverting the signals and defining them as either TTL Logic 1's or 0's.

The two logic level signals are then applied to a logic network consisting of two X-NOR gates 67, 68, whereby each logic signal is applied as an input to X-NOR gate 67, which through a resistor 69, generates a logic level control signal. The inputs to the second X-NOR gate 68 consist of the output from the first X-NOR gate 67 and the output from Schmitt Trigger Inverter gate 66. This logic network "decides", based on the results of the comparators 56, 57, whether the valve position is too low, correct, or too high and then generates the correct logic level control signal in accordance with the given condition.

The logic level control signal generated by X-NOR gate 67 is passed on as a triggering voltage for a solid-state relay 70, which when triggered provides the necessary 12 v AC to activate the holding circuit and therefore the desired holding effect. The logic level control signal generated by X-NOR gate 68 through pull-up resistor 71 is passed on as a triggering voltage for a solid-state relay, which, when 72 triggered, provides the necessary 110 V AC drive to terminal 1 of the AC synchronous motor 73 to provide the desired actuator movement. The second 110 V AC leg is continually applied at terminal 2 of the AC synchronous motor 73.

It should be noted that the 110 v AC current drive is described as a preferred embodiment. This should not exclude, from the scope of the following claims, the use of uni-polar direct current to power the uni-directional rotation of the motor 3 after suitable modifications of the circuit shown in FIG. 2 have been made.

A 12 V DC signal enters the AC input terminals of a fullwave bridge rectifier 74 through a relay 70. The bridge rectifier 74 then converts the AC signal into a DC signal. This DC signal is then applied to two Silicon Controlled Rectifiers 75, 76, which are configured in the following manner: An SCR 75 is cathode-connected to the negative terminal of the bridge rectifier 74, anode-connected to terminal 2 of the motor 73, and gate-connected through a resistor 77 to the positive terminal of the bridge rectifier 74; the second SCR 76 is anode-connected to the positive terminal of the bridge rectifier 74, cathode-connected in series with a power resistor 79 to terminal T1 of the motor 73, and gate-connected through a resistor 78 to the positive terminal of the bridge rectifier 74. The function of this configuration is to allow the SCR's 75, 76 to be triggered only by the presence of the DC signal and consequently pass it through. The fact, that the SCR's 75, 76 will only be triggered by the DC signal, prevents the possibility of generating a short circuit through the holding circuit, when the AC drive signal is applied to the motor 73. The circuit is completed with the power resistor 79, which provides a resistance buffer to absorb any leakage currents or surge currents, which may develop during the application of the AC drive signal to the motor 73.

Resistor 80 and a capacitor 81, which are series-connected from terminal T1 of the motor 73 to terminal T3 of the motor 73, provide the 90 degree phase shift required for proper operation of the motor 73.

The basic purpose and desired function of the control circuit as exemplified in FIG. 2 is to assure that the ultimate position of the stem 16 is in direct proportion to the 4 to 20 mA signal that is issued by said external control device. When the circuit is subjected to a 4 mA signal, the stem 16 should, typically be in the lowest (extended) position corresponding to a closed valve, if such valve would be connected to the actuating device, while a 20 mA signal customarily calls for a fully open valve i.e. a fully retracted stem 16.

The circuit converts the 4 to 20 mA signal to a corresponding voltage signal that is then compared to a feedback voltage that is generated by a potentiometer 24 (see FIG. 1). Both voltages have to be balanced to satisfy the steady state circuit requirements, that is, the rotary position of the potentiometer 24 and thereby the position of the stem 16 has to correspond to the signal input level. If there is a positive imbalance between the two then AC current is switched on, as described, to drive the motor 3 and move the stem 16 up. For a negative imbalance between the input signal and the feedback voltage all power to the motor is disconnected and spring 20 is allowed to push the stem 16 down. After the stem 16 has extended sufficiently to cause the potentiometer 24 to produce a lower voltage corresponding to the input signal voltage, then the circuit will switch the described DC current to the motor windings to hold the actuating device in this desired position.

It should be recognized, that numerous changes can be made by me without departing from the scope of the following claims.

I claim:

1. Electric actuating means comprising:
   (a) electric motor means with output shaft, said shaft capable of being rotary motivated by suitably switched electric currents to said motor and further being capable of retaining a fixed position when said motor is subjected to polarity-fixed electric currents;
   (b) electrical amplifying circuit means capable of first switching electric current to said motor capable to rotate the shaft in one direction, secondly to generate a sufficiently constant current for holding said shaft in a desired position, and thirdly to de-energize the motor completely if rotating of said motor shaft in the opposite direction is desired;
   (c) mechanical means motivated by said electric motor shaft and capable of converting more than fifty percent of the motor's mechanical rotary power output into reciprocating mechanical power, said mechanical means coupled to at least one stem and at least one mechanical spring, the latter capable of overcoming mechanical or electrical resistance forces and further being able, together with said mechanical means, to rotate said electric motor shaft whenever said electric motor is substantially de-energized and wherein said mechanical means comprises a suitably supported spindle having two seperate threaded sections with differing pitch diameters, at least one cable, portions of which being wound around each threaded section of said spindle, and one or more pulleys capable of engaging said cable and motivating said stem.

2. Electric actuating means as described in claim 1, wherein said electric amplifying means comprise:
   (a) a logic circuit capable of comparing an input signal voltage to a feedback voltage and further capable of generating an error signal if the level of said feedback voltage exceeds a minimum difference from said input signal voltage;
   (b) a holding circuit comprising suitable relay means to pass alternating electric current needed for a rectifier bridge to generate sufficiently direct current to be applied to said motor and prevent any rotation of said motor shaft by said mechanical and spring means, in case no substantial difference exists between said input signal voltage and said feedback voltage, said holding circuit further being capable of de-energizing said direct current and thereby allowing for motor shaft rotation in case the feedback voltage differs sufficiently from said input signal voltage;
   (c) a running circuit having suitable relay means to conduct alternating current, to said motor and cause subsequent motor shaft rotation if said input signal voltage exceeds said feedback voltage by a desired amount.

3. Electric actuating means as described in claim 2 wherein said holding circuit is further comprised of:
   (a) a full-wave bridge rectifier capable of converting an alternating electric current into a sufficiently stable direct current capable of preventing rotation of said motor shaft;
   (b) a Silicone Controlled Rectifier, being anode connected to a positive terminal of said bridge rectifier and gated through a resistor to that same point, capable, together with a second silicone controlled rectifier being cathode-connected to the negative terminal of said bridge rectifier but also gated through a resistor from the same point as the former silicone controlled rectifier, of passing said direct current when said direct current is present and further capable of blocking any electrical signal which may appear at an unterminated leads of said silicone controlled rectifiers;
   (c) a power resistor, series-connected with the cathode of the former mentioned silicone controlled rectifier, of sufficiently low ohmage as to pass a substantial share of the desired direct current on to said electric motor; said resistor further being capable of absorbing any power surges and leakage current which may be applied across it during the application of alternating electric current to said electric motor when said electric motor shaft is being electrically rotated.

4. Electric actuating means as described in claim 1, wherein said mechanical means consists of:
   (a) said spindle having one terminating end suitably configured to couple and engage said motor shaft, bearing means located on either end of said spindle to support the latter, the center section of said spindle being further sub-divided into one smaller pitch diameter threaded portion and one large pitch diameter threaded portion;
   (b) a yoke retaining at least one said pulleys, said spring engaging said yoke and capable of being compressed by motion of said yoke and pulley toward said spindle;
   (c) said stem connected to said yoke and pulley;
   (d) said cable, one end of which being wound around the larger diameter pitched threaded portion of said spindle, said cable further engaging at least one of said pulleys and having the other end wound around the smaller diameter pitched threaded portion of said spindle, said cable being able to simultaneously wind up on the threaded portion of said spindle having a larger pitch diameter while unwinding from the threaded portion having a smaller pitch diameter thereby shortening the distance between said pulley and said spindle and compressing said spring and motivating said stem.

* * * * *